March 17, 1964
R. J. FOX
3,125,148
ANTI-SKID TRACTION DEVICE
Filed Sept. 11, 1963
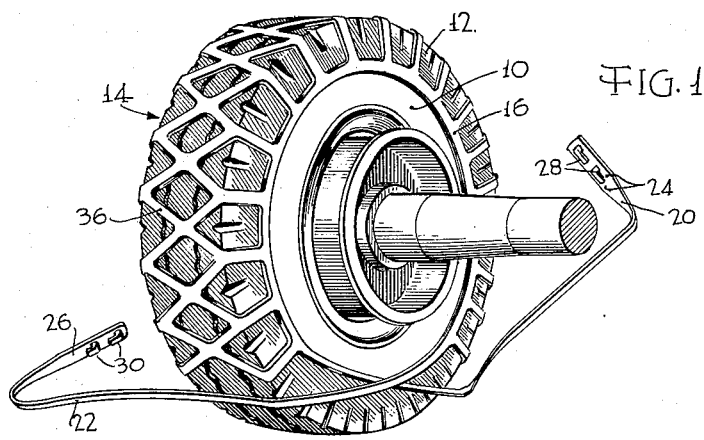
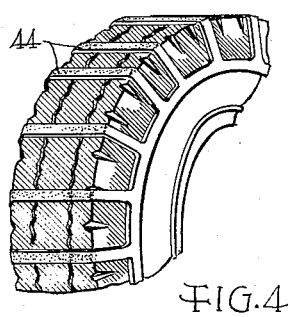
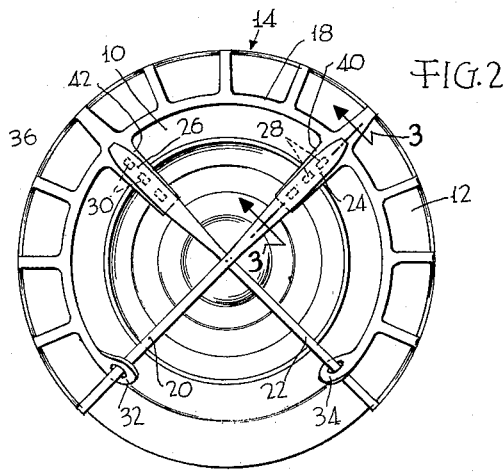
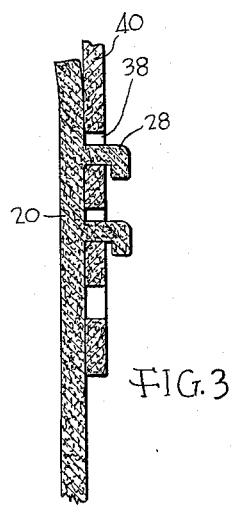
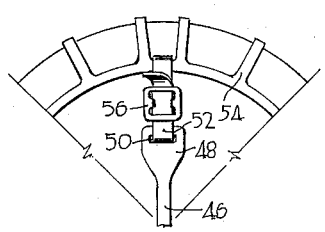
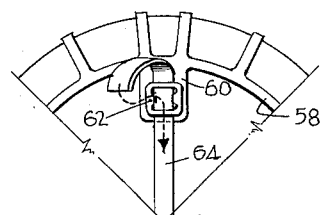
INVENTOR.
Richard J. Fox
BY
ATTORNEY

United States Patent Office 3,125,148
Patented Mar. 17, 1964

3,125,148
ANTI-SKID TRACTION DEVICE
Richard J. Fox, 158 Cobalt Ridge Drive S., Levittown, Pa.
Filed Sept. 11, 1963, Ser. No. 308,110
6 Claims. (Cl. 152—221)

This invention relates to a novel anti-skid traction means for vehicle tires and it particularly relates to a molded type traction means.

Anti-skid traction means for tires have heretofore generally taken the form of tire chains comprising a pair of annular side chains having free ends and connected by parallel cross-chains. These tire chains had to be draped over the top of the tire and the the loose ends of each of the side chains had to be pulled around and under the tire and clamped together. This required that the vehicle be jacked up or otherwise moved or manipulated in order to pull the chains thereunder.

Attempts were made to overcome the necessity for jacking up or otherwise manipulating the vehicle by making one of the annular side chains continuous or endless and the other side chain discontinuous or with loose, free ends. The chain assembly was then to be draped over the top of the tire with the continuous side chain on the front face and the discontinuous side chain on the inside face of the wheel. The free ends of the discontinuous side chain were then to be passed through eyelets on the inside or discontinuous side chain, then passed around to the outside of the wheel, then passed through eyelets on the outside side chain, then crossed over each other on the front face of the wheel and then coupled at their ends to the outside side chain. In order to accomplish this, it was necessary first to find the loose chain ends behind the wheel and then to thread them through the eyelets on the rear surface of the wheel. This could not be readily accomplished unless the person were under the vehicle in a position to face the inside surface of the wheel. It was also necessary to maintain the tautness in the loose chain ends while clamping them in position, otherwise slack would develop and the chains would bruise the tire during use. This required even more effort and skillful manipulation than the ordinary tire chains where each side chain could be separately coupled.

Attempts were also heretofore made to construct anti-skid traction means from molded material. However, such prior molded type devices could not be made to conform tightly to any tire except that size and type for which it was specifically molded. Furthermore, it was still usually necessary to jack up the vehicle in order to attach the traction device to the wheel or to otherwise manipulate the vehicle in snow or ice, a factor which was often very undesirable.

It is one object of the present invention to overcome the aforesaid difficulties and problems of the prior art by providing an anti-skid traction device which, although of molded construction, is adapted for adjustment to the tire, and which can be easily secured to the tire without jacking up or otherwise manipulating the vehicle.

Another object of the present invention is to provide an anti-skid traction device, of the aforesaid type, which is relatively simple in construction, inexpensive to produce and easy to use.

Other objects and many of the attendant advantages of this invention will be readily appreciated as the same becomes better understood by reference to the following description when read in conjunction with the accompanying drawings wherein:

FIG. 1 is a perspective view of an anti-skid traction device embodying the present invention, the device being shown in the process of being applied to a tire on a wheel.

FIG. 2 is a front elevational view of the elements of FIG. 1, but showing the traction device secured in place on the tire and wheel.

FIG. 3 is a fragmentary sectional view taken on line 3—3 of FIG. 2.

FIG. 4 is a fragmentary perspective view of a modified form of the invention.

FIG. 5 is a fragmentary, elevational view of another modification of the invention.

FIG. 6 is a fragmentary elevational view of yet another modification of the invention.

Referring now in greater detail to the various figures of the drawings wherein similar reference characters refer to similar parts, there is shown an automotive wheel 10, of standard construction, on which is mounted a rubber tire 12. An anti-skid traction device, generally designated 14, is shown in FIG. 1 as being applied to the tire 12 and in FIG. 2 as being secured in place on the tire. The traction device 14 comprises an annularly-curved inner side strip 16 (shown in FIG. 1) and an annularly-curved outer side strip 18 (shown in FIG. 2).

The strip 16 is not endless but is provided with loose elongated end portions 20 and 22. These end portions comprise strap means and are each provided with a widened end, as at 24 and 26 respectively. Each widened end is provided with one or more hooks, as at 28 and 30 (three hooks being optionally illustrated at each end). The strip 18 is also not endless but is provided with spaced ends, each of which embodies an eyelet, as at 32 and 34. Extending transversely between the side strips 16 and 18 are treads 36 each of which comprises two opposite straight portions, one connected to the side strip 16 and the other to the side strip 18, and a diamond shaped center portion connected between the two straight portions (as best shown in FIG. 1).

The entire traction device 14 is constructed of molded plastic material, such as rubber, any one of various standard types of synthetic resins, etc. Regardless of the material used, however, the molding is such that not only does the traction device generally conform to the shape and size of the tire but the strap portions 20 and 22, which are positioned on the inside face of the wheel when the traction device is in place (as in FIG. 1), fall naturally into the crossed, outwardly-extending position shown in FIG. 1. This places these strap portions in a readily accessible position to be grasped by a person facing the outside surface of the wheel. All that is then necessary is to pull these strap portions around the rim of the tire and then through the corresponding eyelets 32 and 34 on the front side of the wheel, after which the strap portions are pulled up in crossed relation (as shown in FIG. 2) and coupled to the outer side strip 18 by engaging the hooks 28 and 30 within corresponding apertures, such as shown at 38 in FIG. 3, in flaps 40 and 42 integrally connected to and dependent from the outer side strip 18. The traction device is thereupon fully secured to the tire without any necessity for jacking up the vehicle, moving the vehicle or, in any other manner, manipulating either the vehicle or the wheel.

In the embodiment shown in FIGS. 1 and 2, the treads 36 of the traction device are shown as being diagonally arranged in alternate directions at the operative portion of the tire. This diamond effect is preferable because it provides the most effective gripping action. However, it is within the scope of the present invention to make the treads in the form of straight bands, such as shown at 44 in FIG. 4. Except for these straight treads 44, the traction device of FIG. 4 is identical to that illustrated in FIGS. 1–3. The straight treads, although providing less gripping action than the diamond-shaped treads, are simpler and less expensive to manufacture than the diamond-shaped treads and may, therefore, be preferred for that reason in certain circumstances.

In FIG. 5 there is shown a modification wherein all the elements are similar to those in FIGS. 2 and 2 except that instead of hook and eyelet fastening means, the strap portions, such as indicated at 46, corresponding to the strap portions 20 and 22, are provided with widened end portions 48 having slits 50 therein. Instead of the flaps, such as shown at 40 and 42 in FIG. 2, there are here provided belts 52 which are looped around the outer side strip 54 between two relatively close treads and pass through the respective slits 50, after which their ends are secured by buckles, as shown at 56. The relatively close treads on either side of the belts 52 are spaced from each other just sufficiently to prevent the belt therebetween from sliding laterally. This type of arrangement may often be preferred because it permits the belts 52 to be tightened or loosened, thereby permitting adjustment of the traction device to accommodate even slight variations in the size or shape of the individual tire or wheel.

The form of the device shown in FIG. 6 is similar to that of FIG. 5 except that the outer side strip 58 is provided with an integral flap 60 to which is secured a buckle 62. The strap portion 64, corresponding to strap portion 46 in FIG. 5, is here made relatively narrow so that it can easily pass through the buckle 62. Here, too, the treads adjacent each flap 60 are relatively close, as in the form shown in FIG. 5. The reason here, however, is to provide greater strength at the area of stress adjacent the flap.

Obviulsy many modifications and variations of the present invention are possible in the light of the above teachings. It is, therefore, to be understood that within the scope of the appended claims, the invention may be practiced otherwise than as specifically described.

The invention claimed is:

1. An anti-skid traction device for vehicle tires comprising an integral, molded assembly including an annular inner side strip and an annular discontinuous outer side strip, said inner and outer side strips being spaced from but parallel to each other and being connected by a series of transverse strips extending therebetween and forming treads for the device, said inner side strip being discontinuous and having a pair of elongated free end portions, said free end portions being molded to normally overlap each other and to bend around from the inner side strip to a position overlying the outer side strip, a pair of spaced eyelets on the ends of said outer side strip, a pair of spaced connecting means on said outer side strip, each of said connecting means being diagonally opposed to a corresponding eyelet, an engagement means on each of said elongated free end portions, and each of said elongated free end portions being constructed to releasably pass through a corresponding eyelet and to be releasably attached to the corresponding diagonally opposed connecting means by connection therewith of its engagement means.

2. The anti-skid traction device of claim 1 wherein said transverse strips are arranged in alternate diagonal directions to form diamond-shaped treads.

3. The anti-skid traction device of claim 1 wherein said transverse strips are arranged in straight, spaced, parallel relation to each other.

4. The anti-skid traction device of claim 1 wherein said connecting means comprises a hook and eyelet connection between each attachment strap and a corresponding flap connected to said outer side strip.

5. The anti-skid traction device of claim 1 wherein said connecting means comprises a pair of belts looped around said outer side strip and a slit in each attachment strap, each belt having one free end and one buckle end, a buckle on each buckle end, the free end of each belt being arranged to pass through the slit of a corresponding attachment strap and to thereafter be engageable by the corresponding buckle.

6. The anti-skid traction device of claim 1 wherein said connecting means comprises a pair of flaps connected to said outer side strip, one flap for each attachment strap, a buckle on each flap, and the free end of each attachment strip being engageable by the corresponding buckle.

References Cited in the file of this patent

UNITED STATES PATENTS

| | | |
|---|---|---|
| 1,719,746 | Baker | July 2, 1929 |
| 2,470,607 | Dritz | May 17, 1949 |
| 2,533,151 | Stevens | Dec. 5, 1950 |
| 2,537,392 | Bettcher | Jan. 9, 1951 |
| 2,580,272 | Bell | Dec. 25, 1951 |
| 3,006,397 | Akutowicz | Oct. 31, 1961 |